S. C. WOLFE.
WIND SHIELD CLEANER.
APPLICATION FILED JULY 6, 1915.
1,171,377.
Patented Feb. 8, 1916.
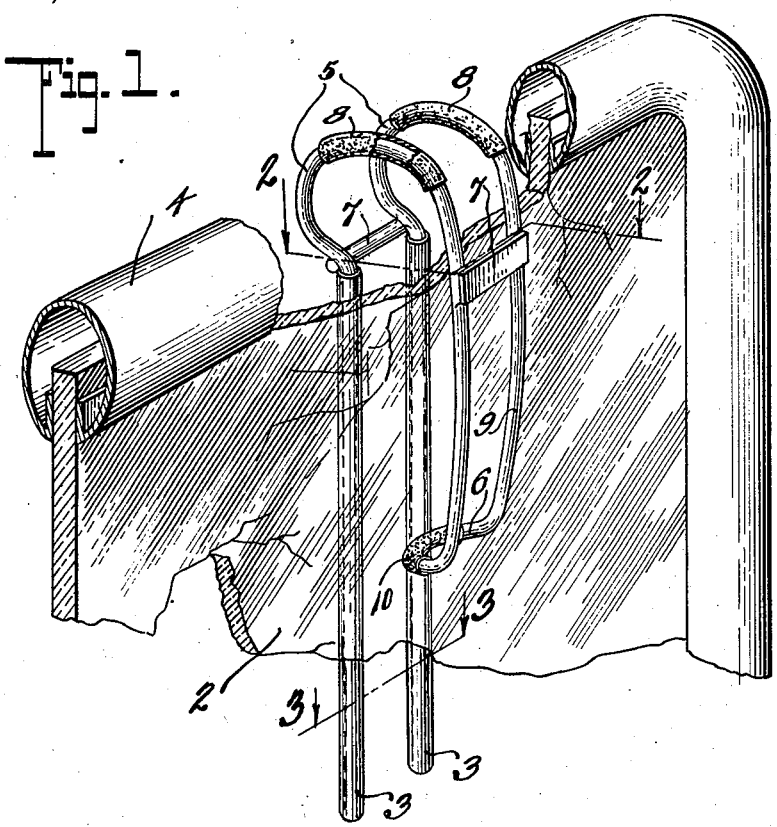
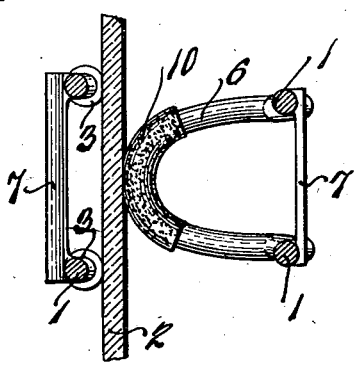
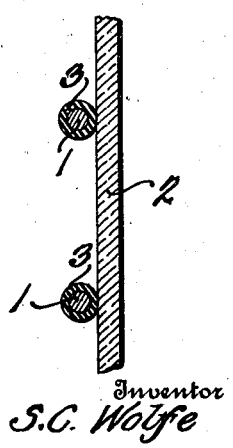
Inventor
S.C. Wolfe
Witness
Ott Wagner
By Robert Cobb
Attorneys

UNITED STATES PATENT OFFICE.

SAMUEL C. WOLFE, OF ANGOLA, INDIANA.

WIND-SHIELD CLEANER.

1,171,377.  Specification of Letters Patent.  Patented Feb. 8, 1916.

Application filed July 6, 1915. Serial No. 38,302.

*To all whom it may concern:*

Be it known that I, SAMUEL C. WOLFE, a citizen of the United States, residing at Angola, in the county of Steuben and State of Indiana, have invented certain new and useful Improvements in Wind-Shield Cleaners, of which the following is a specification.

The present invention in its specific adaptation relates to improvements in automobile windshields cleaners, designed for the purpose of clearing moisture, rain, or dust from the field of vision of the operator of the vehicle.

The primary object of my device has been carried out having in mind particularly simplicity of construction, economy of manufacture, and facility of operation, all of which lend most advantageously to the desirability and utility of the article.

In its broader phase, the invention consists of a wiper member comprising a body adapted to be drawn over the surface to be cleansed, said body being of a resilient character to enable adaptation or conformity to the said surface, a covering or casing for said member for performing the cleaning or wiping function, and means for manipulating the body member. With this in mind, I desire it to be understood that the invention is subject to such modification as will enable it to best serve to accomplish the cleaning and drying of windows and tile or similar surfaces, and hence I do not wish to be confined to the specific configuration described in the following specification and illustrated in the annexed drawing, wherein:

Figure 1 is a perspective view of the preferred embodiment of the device shown as applied to a windshield, parts of the latter being broken away and shown in section. Fig. 2 is a horizontal sectional view taken approximately on the plane indicated by the line 2—2 of Fig. 1; and Fig. 3 is a horizontal section on the line 3—3 of Fig. 1.

Throughout the following detail description, and on the several figures of the drawings, similar parts are referred to by like reference characters.

Describing the embodiment of this device, it will be observed that the cleaner comprises essentially a body member consisting of a rod or heavy wire which is bent at an intermediate point so that the end portions of the rod lie adjacent to each other. These end portions, designated in the drawing 1, 1, are arranged in spaced relation and parallel with each other so as to lie flat upon the surface of the wind shield 2 with which the device is adapted to coöperate. These end portions, in carrying out their function, constitute wiper members, and each has a tubular casing or covering 3 preferably of rubber or similar material, snugly fitting around the rod extremities and being suitably attached thereto by adhesive to prevent displacement from the wiper elements. An essential characteristic of the device is the resiliency of the material of which it is composed and with this in mind the rod is bent adjacent to the upper frame member 4 of the windshield to form an arch 5 spanning said upper frame member, the rod extending downwardly on the opposite side of the windshield and finally at the recurved extremity bent inwardly as indicated at 6 to form a contact or pressure point coöperating with the surface of the shield at the opposite side to the wiper members 1, 1. It will be observed that stays 7 are provided at different points in the cleaner to hold the bent sides of the rod in proper spaced relation, said stays being suitably connected by electric or other welding process for maintaining the rigid relation hereinbefore mentioned. The side members of the cleaner are each wrapped at the arched portion with a felt pad 8 to prevent marring of the shield frame and with a view to facilitating free movement of the device along said frame. The downwardly extending extremity of the device, it will be observed, is curved outwardly to form a convenient handhold, designated 9 and affording means for manipulating the cleaner to move the same from side to side of the shield for the purpose of accomplishing the cleansing action. The lower extremity or point 6 of the handle 9 is also wrapped with felt or padding 10 for bearing upon the surface of the glass and which also will move freely over the surface of the glass with a minimum amount of friction.

With the foregoing description of the construction of this simple article in mind, a few of the advantages and important features of the same will be mentioned. The use of the tubular coverings for the wiper elements enables replacement when said coverings become worn from use, and it is within the purview of the invention that the casings may be shifted so as to bring a new surface to bear upon the windshield where entire replacement of the casing is not desired or necessary. The fact that the material from which the article is made possesses resiliency insures the conformity of the wiper members to the surface operated upon where such surface is uneven. The resiliency also provides ample tension so that the handle 9 will exert a sufficient amount of pressure to produce the proper adaptation of the wiper elements to the outer surface of the windshield. The arched portion of the cleaner is of such curvature as to secure the latitude of spring tension to enable the device to open sufficiently to place the cleaner over the top of the shield without distorting it.

The actuation of the cleaner from side to side is accomplished by grasping the handle 9, as hereinbefore mentioned, just above the contacting extremity 6 and while the normal pressure on the wiper members is sufficient to obtain a proper cleansing of the glass surface, additional pressure may be produced by pulling on the handle as the cleaner is moved to and fro. Obviously the use of two wiper members, as provided for in this construction, operating in parallel relation, enables the cleaning and drying of the glass to be most completely performed, the first member acting to take the greater proportion of moisture or dust and the second member completing the cleaning operation.

Having thus described my invention, what I claim as new is:

1. A windshield cleaner of the class described comprising a wiper member adapted to be moved over the surface to be cleaned, a tubular covering or casing for said wiper member snugly fitting and shiftably arranged on said wiper member, the covering having an uninterrupted contact surface whereby said casing may be shifted as wear takes place to bring into position an unworn contact surface, and means for manipulating said wiper member.

2. A windshield cleaner of the class described comprising a wiper member adapted to be moved over the surface of said shield at one side, a handle for manipulating the wiper member coacting with the surface at the opposite side of the shield, and connecting means therebetween arching the shield and holding the wiper and handle members in the surface engaging positions aforesaid, said connecting means having a relatively broad contact bearing on the shield for maintaining the cleaner against rocking movement during cleaning movements.

3. A windshield cleaner of the class described comprising spaced wiper members adapted to be moved over the surface of the shield, and a handle for manipulating the same, the wiper members having means slidably engaged with the shield at spaced points whereby to maintain the cleaner in a vertical plane during wiping movement.

4. A windshield cleaner of the class described comprising a rod bent intermediate its length to bring the end portions adjacent to each other, said end portions comprising spaced wiper members adapted to be moved over the surface of the shield, the rebent portion of the rod being bent over the shield to provide a spring arch holding the cleaner on the shield, said rebent portion engaging the shield at the other side and forming a handle for manipulating the wiper members.

5. A windshield cleaner of the class described comprising a rod consisting of resilient material, said rod being bent intermediate its length to bring the ends thereof in spaced parallel relation to each other to form wiper members adapted to be moved over the surface of the shield, the rebent portion of the rod being bent over the shield to engage the same at the other side and to form a yieldable handle for manipulating the wiper members.

6. As a new article of manufacture, a windshield cleaner comprising a rod consisting of resilient material, said rod being bent at an intermediate point in its length to bring the end portions thereof in spaced parallel relation to each other, the rebent portion of the rod being arched over the windshield and curving away from the same to form a manipulating handle, the arched portion being yieldable to permit of springing of the device into position over the shield, the lower extremity of the handle being bent inwardly for bearing upon the windshield, tubular coverings surrounding the end portions for cleaning the surface of the shield upon movement of the cleaner to and fro therealong, and stay means holding the end portions aforesaid in spaced relation to each other.

7. A windshield cleaner of the class described comprising independently operable wiper members arranged to successively wipe the surface of the shield, manipulating means common to the wiper members and coacting with the opposite side of the shield, and resilient connecting means intermediate the handle and the wiper members, permitting the independent action of the latter, and holding the cleaner on the shield.

In testimony whereof I affix my signature.

SAMUEL C. WOLFE.